US 7,841,624 B2

(12) United States Patent
Kobayashi et al.

(10) Patent No.: US 7,841,624 B2
(45) Date of Patent: Nov. 30, 2010

(54) VEHICLE BODY STRUCTURE HAVING FUEL TANK AND CANISTER

(75) Inventors: Kazuhiro Kobayashi, Saitama (JP); Masashi Murota, Saitama (JP); Takeshi Ohishi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 281 days.

(21) Appl. No.: 12/148,563

(22) Filed: Apr. 21, 2008

(65) Prior Publication Data

US 2008/0265556 A1    Oct. 30, 2008

(30) Foreign Application Priority Data

Apr. 26, 2007   (JP)  ............... 2007-117644

(51) Int. Cl.
*B60P 3/22*     (2006.01)
(52) U.S. Cl. .................... 280/834; 180/69.4
(58) Field of Classification Search ........... 280/834, 280/830; 180/69.4
See application file for complete search history.

(56) References Cited

U.S. PATENT DOCUMENTS

| 4,545,589 | A  | * | 10/1985 | Watanabe et al. | ........... 280/834 |
| 4,550,923 | A  | * | 11/1985 | Ogawa et al. | ............... 280/834 |
| 5,702,125 | A  | * | 12/1997 | Nakajima et al. | .......... 280/834 |
| 5,868,428 | A  |   | 2/1999  | Ishikawa | |
| 6,308,987 | B1 | * | 10/2001 | Mitake | ....................... 280/834 |
| 6,893,047 | B2 | * | 5/2005  | Chou et al. | ................ 280/834 |
| 2004/0200356 | A1 | | 10/2004 | Kuperus | |

FOREIGN PATENT DOCUMENTS

| EP | 0 067 652 A | 12/1982 |
| JP | 2004-143966 | 5/2004 |

* cited by examiner

*Primary Examiner*—Kevin Hurley
(74) *Attorney, Agent, or Firm*—Carrier Blackman & Associates, P.C.; William D. Blackman; Joseph P. Carrier

(57) ABSTRACT

A vehicle body structure with a fuel tank and canister is disclosed. A communication path connecting a fuel tank with a canister is provided to pass between a rear cross-member and an expanded portion of an underbody.

8 Claims, 10 Drawing Sheets

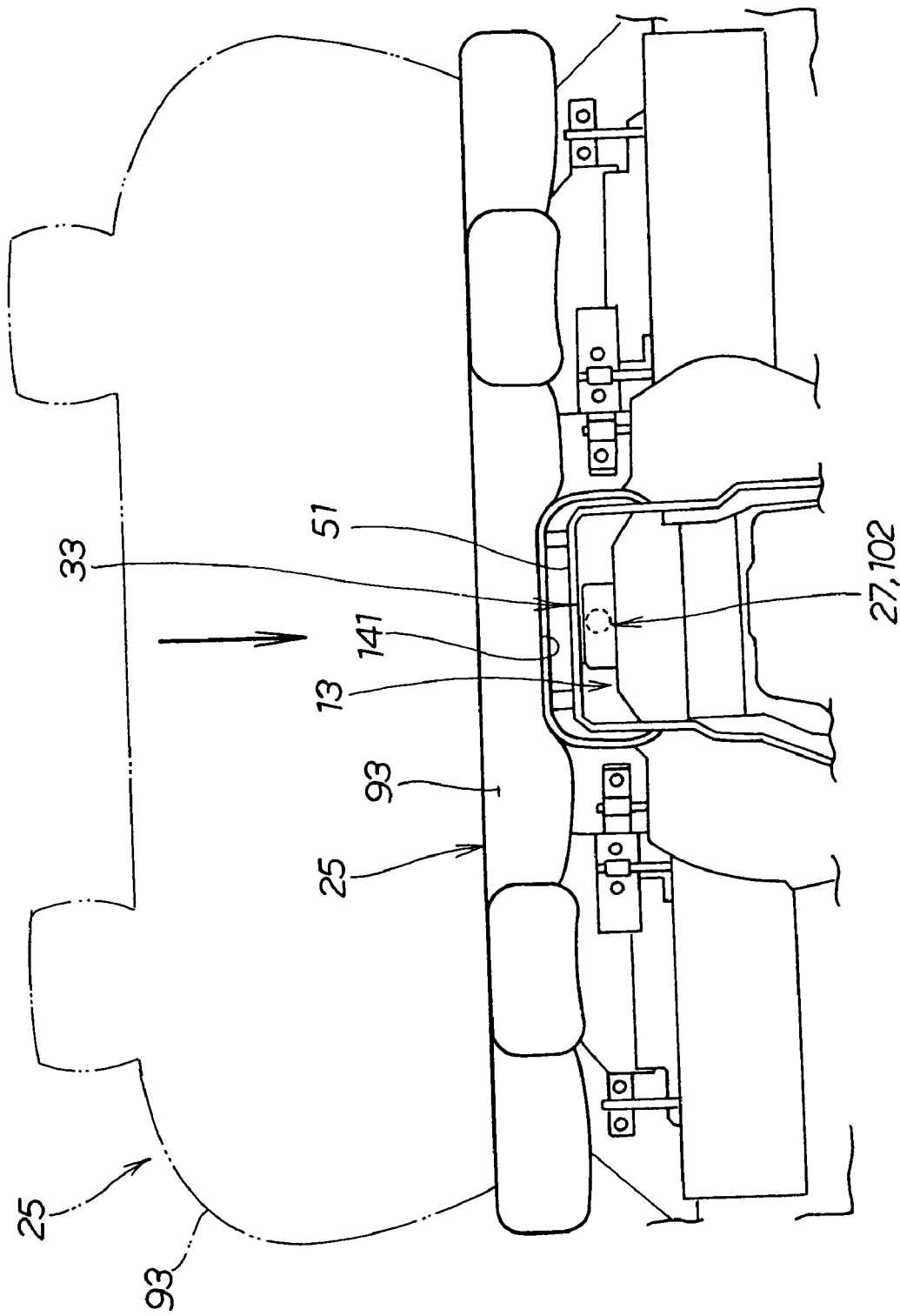

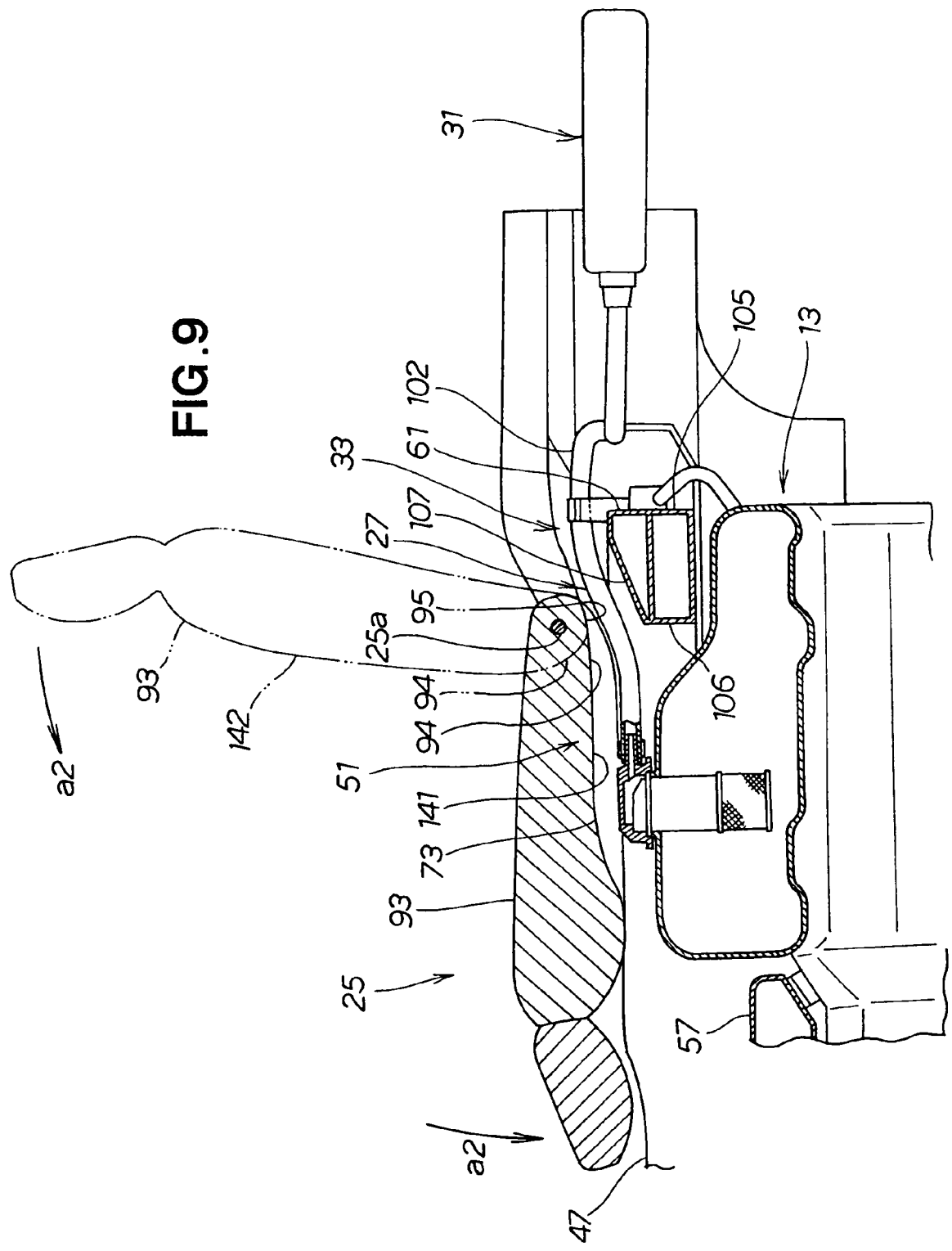

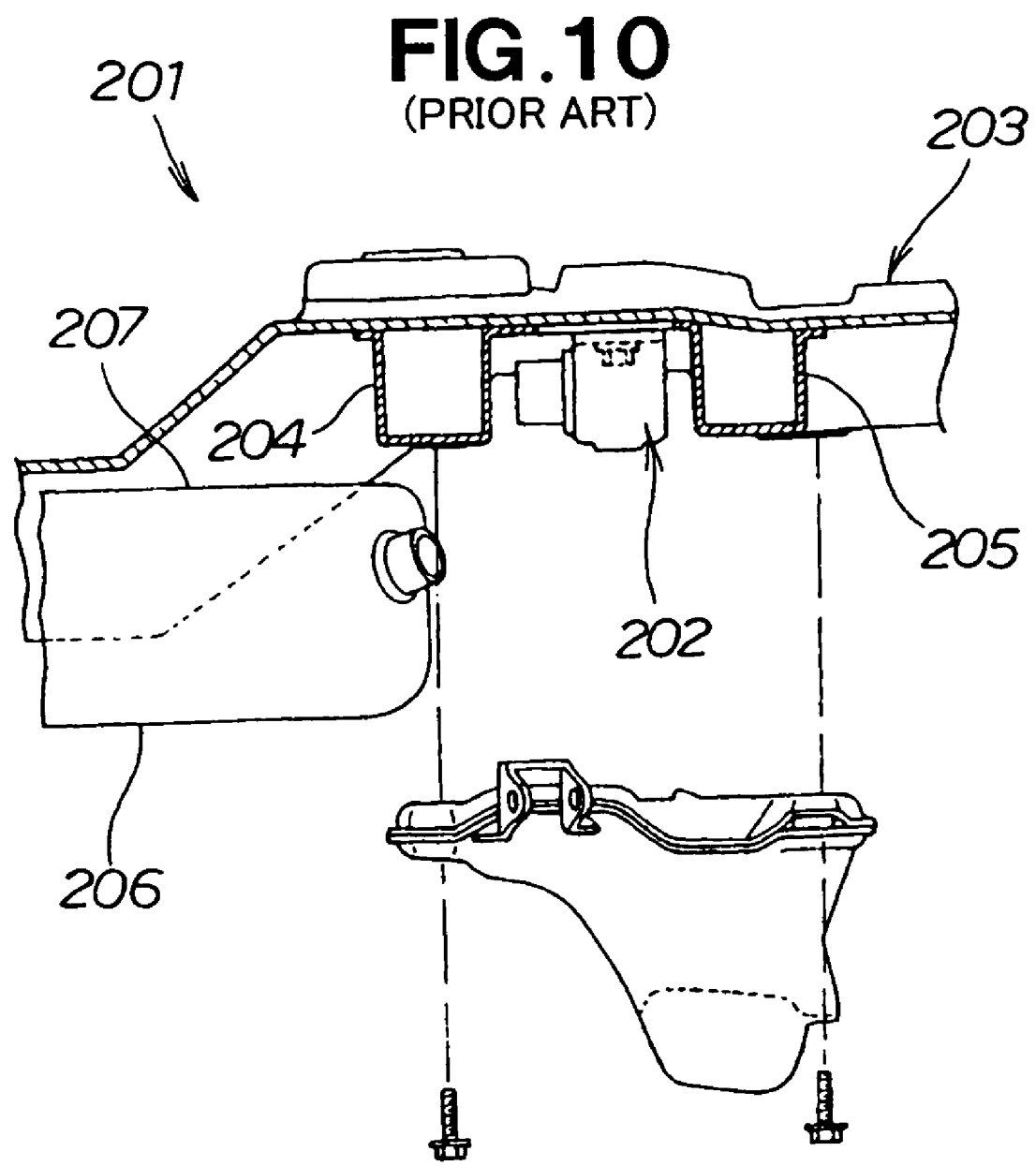

VEHICLE BODY STRUCTURE HAVING FUEL TANK AND CANISTER

FIELD OF THE INVENTION

The present invention relates to a vehicle body structure in which a communication path is formed for accommodating a pipe that provides communication between a fuel tank and a canister for recovering fuel gas vapors from the fuel tank.

BACKGROUND OF THE INVENTION

Vehicles generally have a fuel tank and a canister disposed below an underbody that constitutes the floor of the vehicle body, and the fuel tank and canister are connected by a pipe through which fuel gas passes.

The canister is disposed in the vicinity of the fuel tank, e.g., between two cross-members that are positioned behind the fuel tank, in order to recover evaporated gas inside the fuel tank, and is thereby protected from rear collision. A mounting structure of a canister is known in, e.g., Japanese Patent Application Laid-Open Publication No. 2004-143966 (JP 2004-143966A). FIG. 10 hereof shows the mounting structure of the canister disclosed in JP 2004-143966A. The mounting structure is described below.

In a mounting structure 201 of the canister shown in FIG. 10, a canister 202 is disposed inside a space formed by a body frame 203, a front cross-member 204, and a rear cross-member 205, and is in communication with a fuel tank 206. The canister 202 is protected by the rear cross-member 205 from a collision from the rear of the vehicle (rear surface collision).

However, in the mounting structure 201 of the canister, fuel must be prevented from flowing into the tube connected to the canister 202 when the fuel tank 206 is moved higher above the ground or when the capacity of the fuel tank 206 is increased while the position of the canister 202 is maintained. For this reason, the tube must be connected so as to be positioned further above an upper surface 207 of the fuel tank 206. However, there is a problem in that the tube and the front cross-member 204 interfere with each other if an attempt is made to place the tube in a position further above the upper surface 207 of the fuel tank 206.

SUMMARY OF THE INVENTION

An object of the present invention is to provide a piping structure for a fuel tank that can greatly increase the capacity of a fuel tank and that can be arranged between canisters without compromising the capacity of the fuel tank.

According to the present invention, there is provided a vehicle body structure having a fuel tank and a canister, which structure comprises: an underbody; a rear cross-member positioned under the underbody and extending transversely of a vehicle body; a fuel tank disposed forwardly of the rear cross-member; a canister disposed rearwardly of the rear cross-member; and a communication path connected between a ceiling portion of the fuel tank and the canister, wherein the underbody has an expanded portion positioned extending at a center of the width of the vehicle body longitudinally of the latter and expanding upwardly, and the communication path is accommodated between the rear cross-member and the expanded portion.

Since the underbody is provided with the expanded portion, part of the ceiling plate portion of the fuel tank can be positioned inside the expanded portion, and the capacity of the fuel tank can be increased.

The communication path, which must be disposed high on the fuel tank, can be passed between the rear cross-member and the expanded portion even if a part of the ceiling plate portion of the fuel tank along the expanded portion is expanded, and the communication path can be connected to the canister behind the rear cross-member without interfering with the underbody and the rear cross-member. Therefore, piping can be disposed in the communication path between the fuel tank and the canister without compromising the capacity of the fuel tank.

The expanded portion is preferably provided with a groove-shaped interior console member. Therefore, the perception of quality of the vehicle interior can be improved.

It is preferred that the underbody have a seatback of a seat mounted on the underbody, the seatback be disposed above the rear cross-member, the seatback have a lower surface, and a notched piping carrier that is open downward along the expanded portion is formed in the seatback lower surface. Therefore, the piping carrier can accommodate the expanded portion, and piping can be disposed in the communication path between the fuel tank and the canister without compromising the capacity of the fuel tank.

It is preferred that the rear cross-member be polygonal in cross section normal to the longitudinal direction, and a height of a front wall portion adjacent to the seatback be less than a height of a rear wall portion that faces the front wall portion. Therefore, a sloping upper wall portion that runs from the front wall portion to the rear wall portion is formed; and the distance to the seatback lower surface can be increased and the piping carrier can be made smaller without compromising the strength of the rear cross-member.

Preferably, the seatback lower surface has a concave portion formed in a shape of a groove so that the expanded portion fits when the seatback has been brought forward and folded. Therefore, the seatback can be brought forward and folded without interfering with the expanded portion. When the seatback is furthermore brought forward and folded, the expanded portion that fits the groove-shaped concave portion acts as a stop and can restrict the distance that the seatback can be folded forward.

In a preferred form, the fuel tank has an upper portion, while the upper portion of the fuel tank is positioned inside the expanded portion. The fuel tank capacity is increased.

BRIEF DESCRIPTION OF THE DRAWINGS

A preferred embodiment of the present invention will be described in detail below, by way of example only, with reference to the accompanying drawings, in which:

FIG. 8 is a front elevational view showing a relationship between the rear seat and the vehicle body structure of the present invention;

FIG. 9 is a cross-sectional view showing a relationship between the rear seat and the vehicle body structure of the present invention; and FIG. 10 is a schematic view illustrating a mounting structure of a conventional canister.

DETAILED DESCRIPTION OF THE PREFERRED EMBODIMENT

Figure 1:
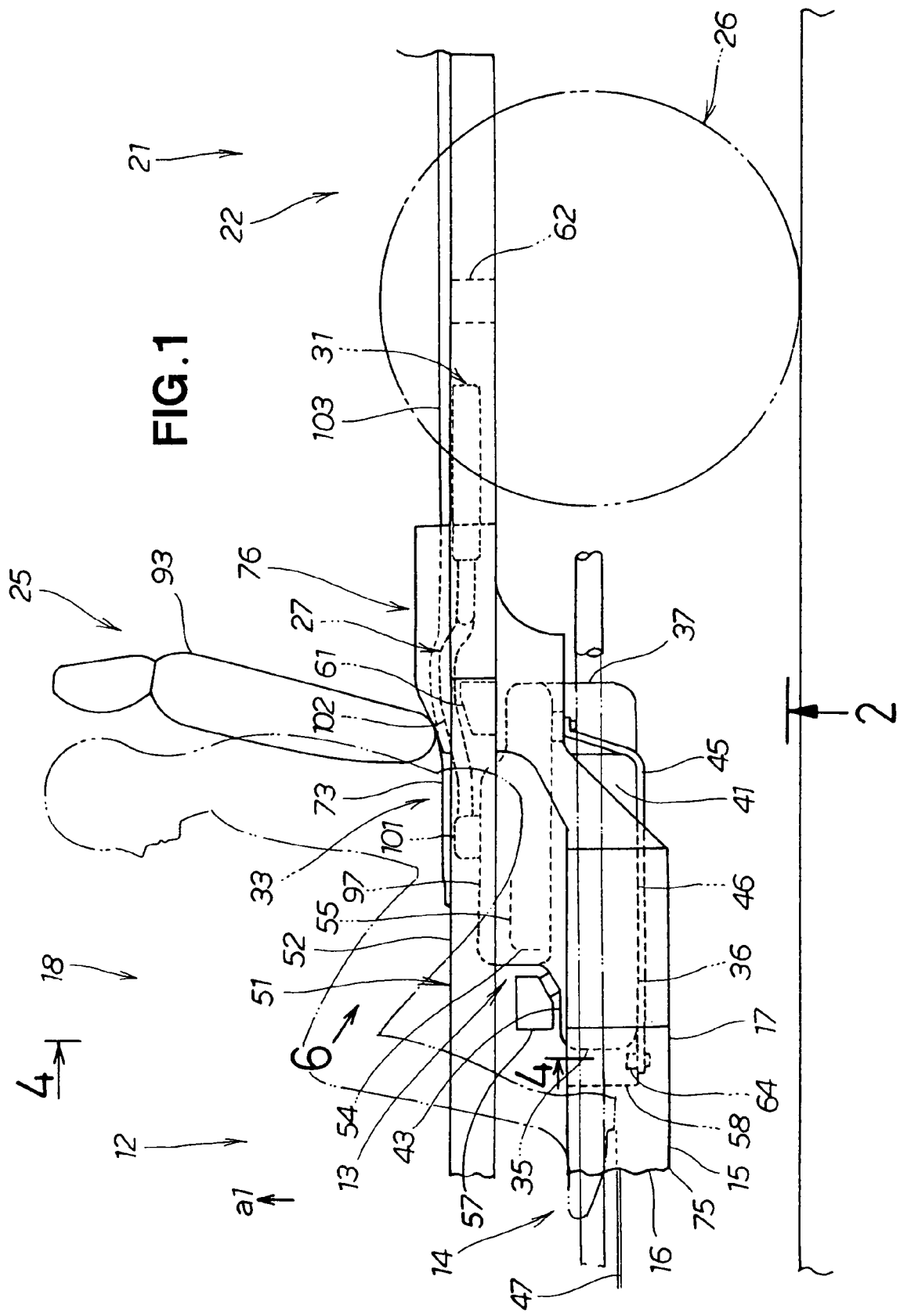
FIG. 1 is a schematic side elevational view showing a body of a vehicle including a body structure according to the present invention.
Figure 2:
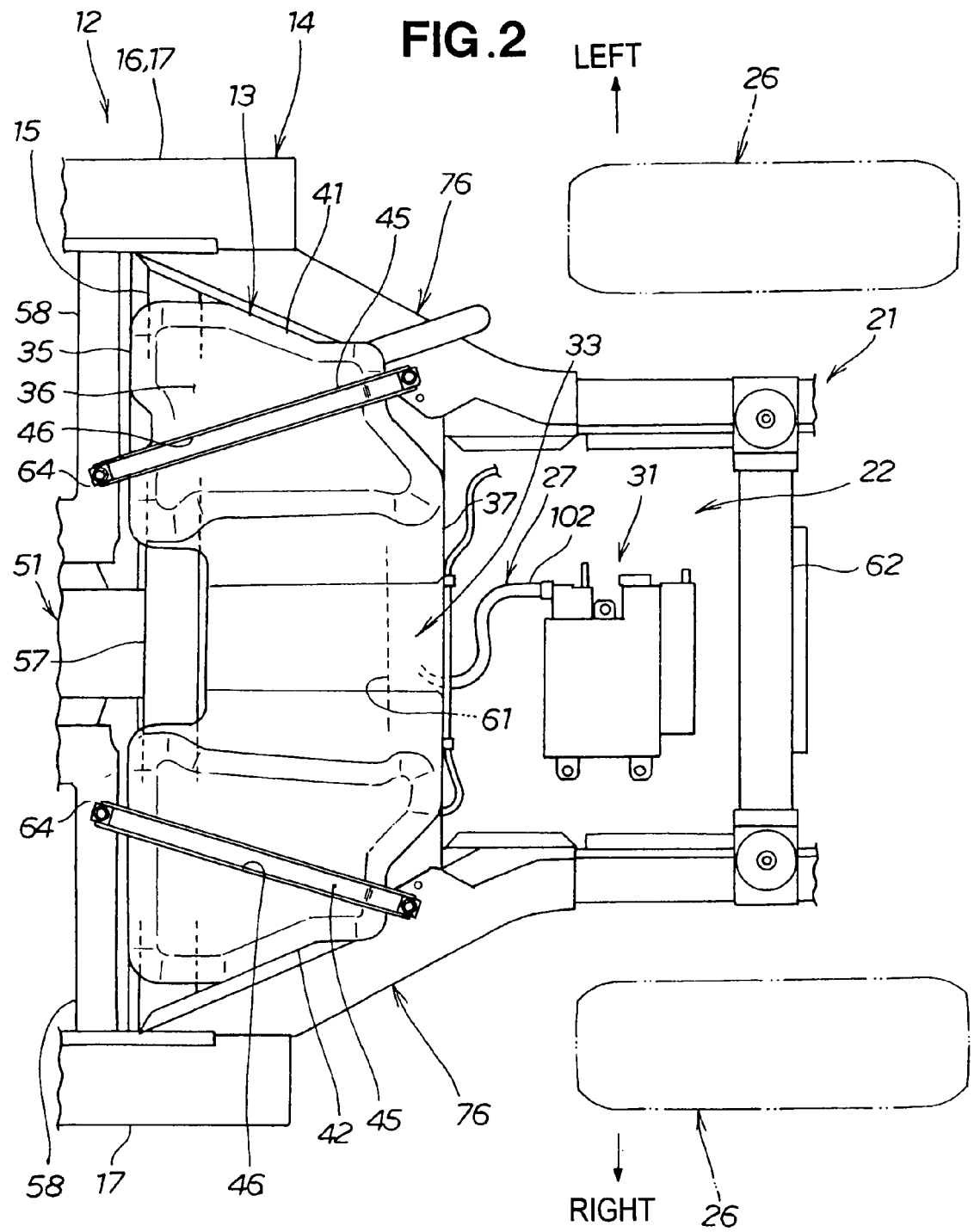
FIG. 2 is a schematic view of the vehicle body as seen in the direction of arrow 2 of FIG. 1, namely, from under the vehicle.

Referring to FIGS. 1 and 2, a vehicle body structure 33 having a fuel tank 13 and a canister 31 is formed on an underbody 15 that constitutes the floor of a vehicle body 14.

A vehicle 12 is provided with the underbody 15; a side sill 17, which is connected to the underbody 15 and is the lower portion of a side body 16; a vehicle interior 18; a rear body 21 and a luggage compartment 22 disposed behind the vehicle interior 18; a seat (rear seat) 25 disposed to the rear inside the vehicle interior 18; a rear wheel 26 supported by the underbody 15 via a suspension device (not shown); the canister 31 connected to the fuel tank 13 via a communication path 27; and the communication path 27.

The fuel tank 13 has a front plate portion 35, a bottom plate portion 36, a rear plate portion 37, a left-side first lateral plate portion 41, a right-side second lateral plate portion 42, and a ceiling plate portion 43.

A groove-shaped banding groove portion 46 on which a band member 45 is suspended is formed on the left and right, respectively, on the bottom plate portion 36.

The material of the fuel tank 13 may be a steel plate or resin.

The underbody 15 has a floor panel 47 mounted between the left and right side sill 17, an expanded central portion 51 formed in the expanded portion of the floor panel 47, and an upper central portion 52 of the expanded central portion 51 that is higher than an upper surface 55 of a seat cushion 54 of the rear seat 25.

The underbody 15 has a center cross-member 57 having one end mounted on the left side sill 17 and the other end mounted on the right side sill 17, a tank front cross-member 58 disposed forward and below the center cross-member 57, a tank rear-end cross-member 61 as a rear cross-member disposed rearward and above the center cross-member 57, and a rear portion cross-member 62 disposed behind the tank rear-end cross-member 61.

The tank rear-end cross-member 61 has one end mounted on the left side sill 17, has another end other mounted on the right side sill 17, and runs along the rear portion of the ceiling portion 43 of the fuel tank 13.

The tank front cross-member 58 is bisected on the left and right, is substantially symmetrically disposed in relation to the expanded central portion 51, and has a tank front mount 64 for the fuel tank 13 that is formed along the front plate portion 35 of the fuel tank 13.

Figure 3:
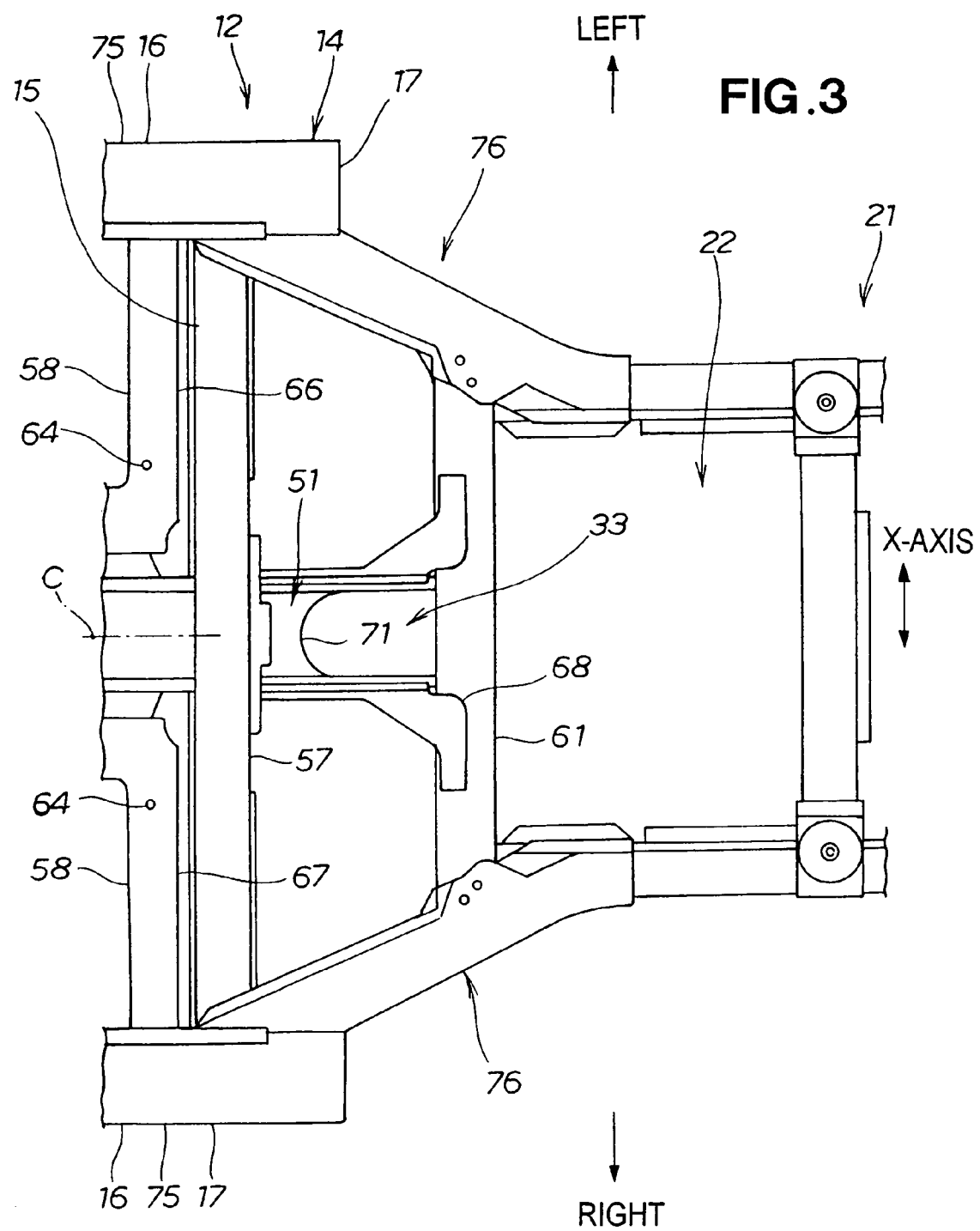
FIG. 3 is a bottom view of the vehicle body with the fuel tank removed.
Figure 4:
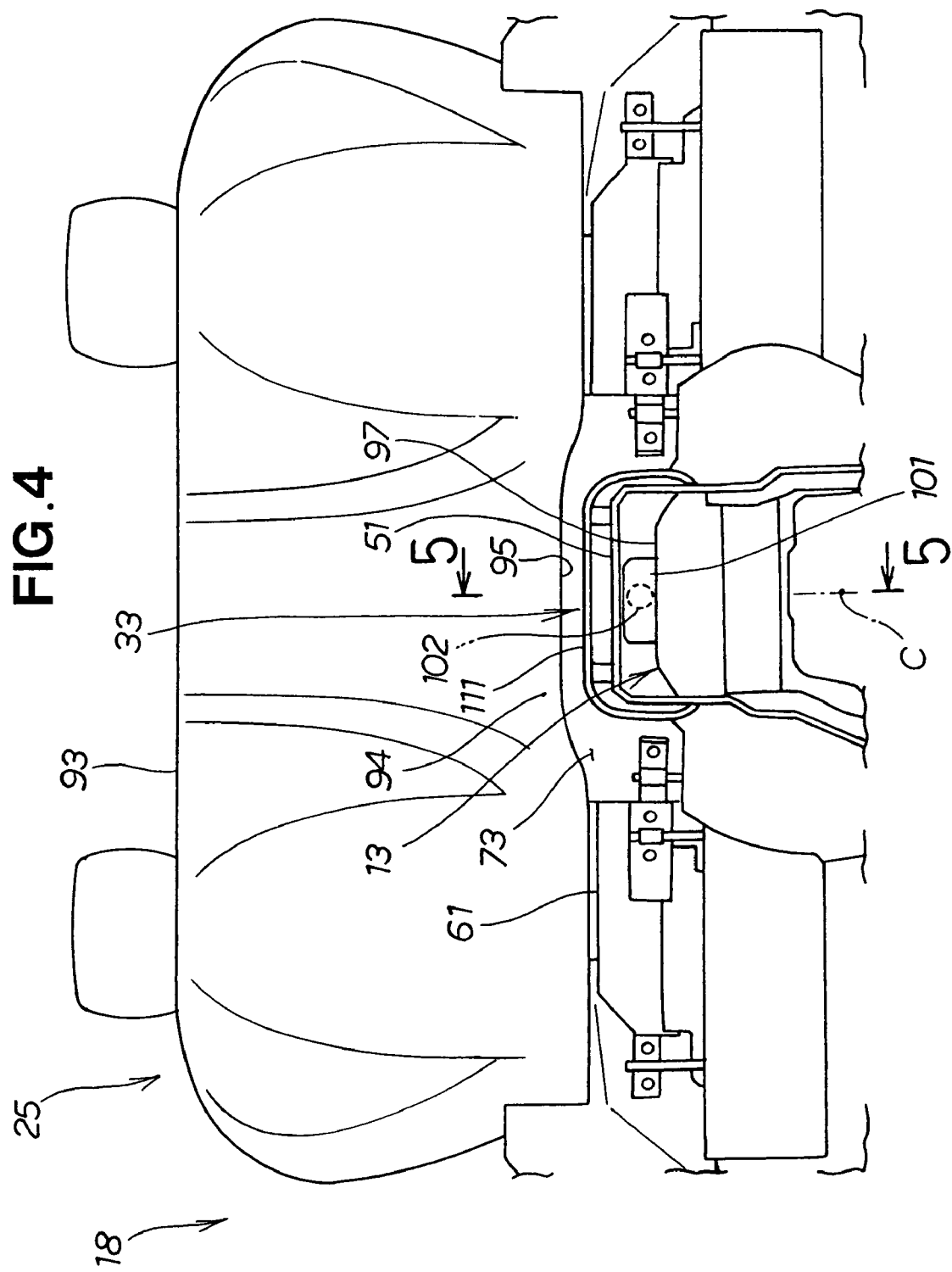
FIG. 4 is a cross-sectional view taken along line 4-4 of FIG. 1.

FIG. 3 is a bottom view of a vehicle body provided with a fuel tank piping structure. This will be described with reference to FIG. 1.

The tank front cross-member 58 is, e.g., a steel plate that has been plastically worked to a prescribed shape, is divided in the center, has a left stay 66 mounted between the left side sill 17 and the expanded central portion 51, and has a right stay 67 mounted between the right side sill 17 and the expanded central portion 51.

The center cross-member 57 is composed of, e.g., a steel plate that has been plastically worked to a prescribed shape.

The tank rear-end cross-member 61 is composed of, e.g., a steel plate that has been plastically worked to a prescribed shape; and a rear-end joint 68 of the expanded central portion 51 is attached in the center thereof.

The expanded central portion 51 is disposed in the center of the vehicle width direction (x-axis direction); an upper central portion 52, which is shaped as a groove parallel to the side sill 17 and bulges into the vehicle interior 18 (FIG. 1, arrow a1); the upper central portion 52 is formed on the floor panel 47; a removal opening 71 is formed in the rear portion; and a rear-end joint 68 linked to the removal opening 71 is connected in the center of the tank rear-end cross-member 61. Also, a groove-shaped interior console member 73 (see to FIG. 1) is mounted on the upper central portion 52. It will be understood from FIGS. 1-2 that a portion of the communication path is accommodated between the rear cross-member and the expanded portion; that the expanded portion has a groove-shaped configuration. The communication path is arranged such that the communication path extends above the fuel tank and within the expanded portion, passes through an opening formed through the expanded portion, extends above the rear cross-member and outside the expanded portion, and communicates with the canister.

The right and left sides of the side sill 17 are substantially symmetrical about a center line C as an axis of symmetry; and the sill is composed of a side sill body 75 positioned below the vehicle interior 18, and a rear side member 76 linked to the rear of the side sill body 75.

Referring to FIGS. 1, 4, 5, and 6, the rear seat 25 seats two people and is composed of the seat cushion 54 mounted on the underbody 15, and a seatback 93 that is foldably connected to the seat cushion 54 via a tilting device 25a.

The tilting device 25a provides support so that the seatback 93 can be laid down in the forward direction as needed in the manner indicated by arrow a2, and the device may be a reclining apparatus, for example.

The seat cushion 54 is formed at a height H so that the lower back portion 54a that corresponds to the lower portion of the seatback 93 is substantially the same height as the expanded central portion 51.

The seatback 93 is disposed above of the rear cross-member (tank rear-end cross-member) 61 and has a piping carrier 95 that is formed so as to be linked to the lower back portion 54a and that is upwardly concave along the expanded central portion 51 in a seatback lower surface 94.

More specifically, the fuel tank 13 has a central communicating arch portion 97 formed at a prescribed height Ht from a main unit 98 in the center, which matches the center (center line C) of the vehicle body 14, and at a prescribed height Hs above the seat cushion 54; a valve mechanism 101 is mounted in the central communicating arch portion 97; one end of a communication channel, i.e., a tube 102, is connected to the valve mechanism 101; and the other end of the tube 102 is connected to the canister 31.

The tube 102 is a large-diameter tube for discharging evaporative gas inside the fuel tank 13.

The canister 31 is mounted on the bottom surface of a rear floor panel 103 of the floor panel 47 in an existing configuration for processing fuel vapors, and is disposed between the tank rear-end cross-member 61 and the rear portion cross-member 62.

The tank rear-end cross-member 61 has a portion that is shorter in the cross section. In other words, a front wall portion 106 facing the front of the vehicle 12 is formed so as to be below a rear wall portion 105 that faces the rear of the vehicle 12, and a forward and downward sloping upper wall portion 107 is formed on the front wall portion 106. The rear-end joint 68, which is linked to the removal opening 71 of the expanded central portion 51, is joined to the front wall portion 106 and the forward and downward sloping upper wall portion 107.

The vehicle body structure 33 features a configuration in which the canister 31 is mounted on the lower surface of the underbody 15, the ceiling plate portion 43 of the fuel tank 13 is disposed at substantially the same height as the canister 31, one end of the tube 102 is joined to the ceiling plate portion 43 via the valve mechanism 101, the other end of the tube 102 is joined to the canister 31, and the tube 102 runs between the floor panel 47 (including the expanded central portion 51) and the cross-member (tank rear-end cross-member) 61.

Specifically, the central communicating arch portion 97 of the fuel tank 13 is accommodated inside the expanded central portion 51, the valve mechanism 101 is disposed inside the expanded central portion 51, the section from one end of the tube 102 to the center passes through the expanded central portion 51, and the section from the center of the tube 102 to the other end exits from the removal opening 71 to the exterior of the expanded central portion 51. The tube runs above the forward and downward sloping upper wall portion 107 of the tank rear-end cross-member 61, and passes between the upper part of the tank rear-end cross-member 61 and the groove-shaped interior console member 73. The other end is disposed to the rear of the tank rear-end cross-member 61 and is connected to the canister 31.

Figure 5:
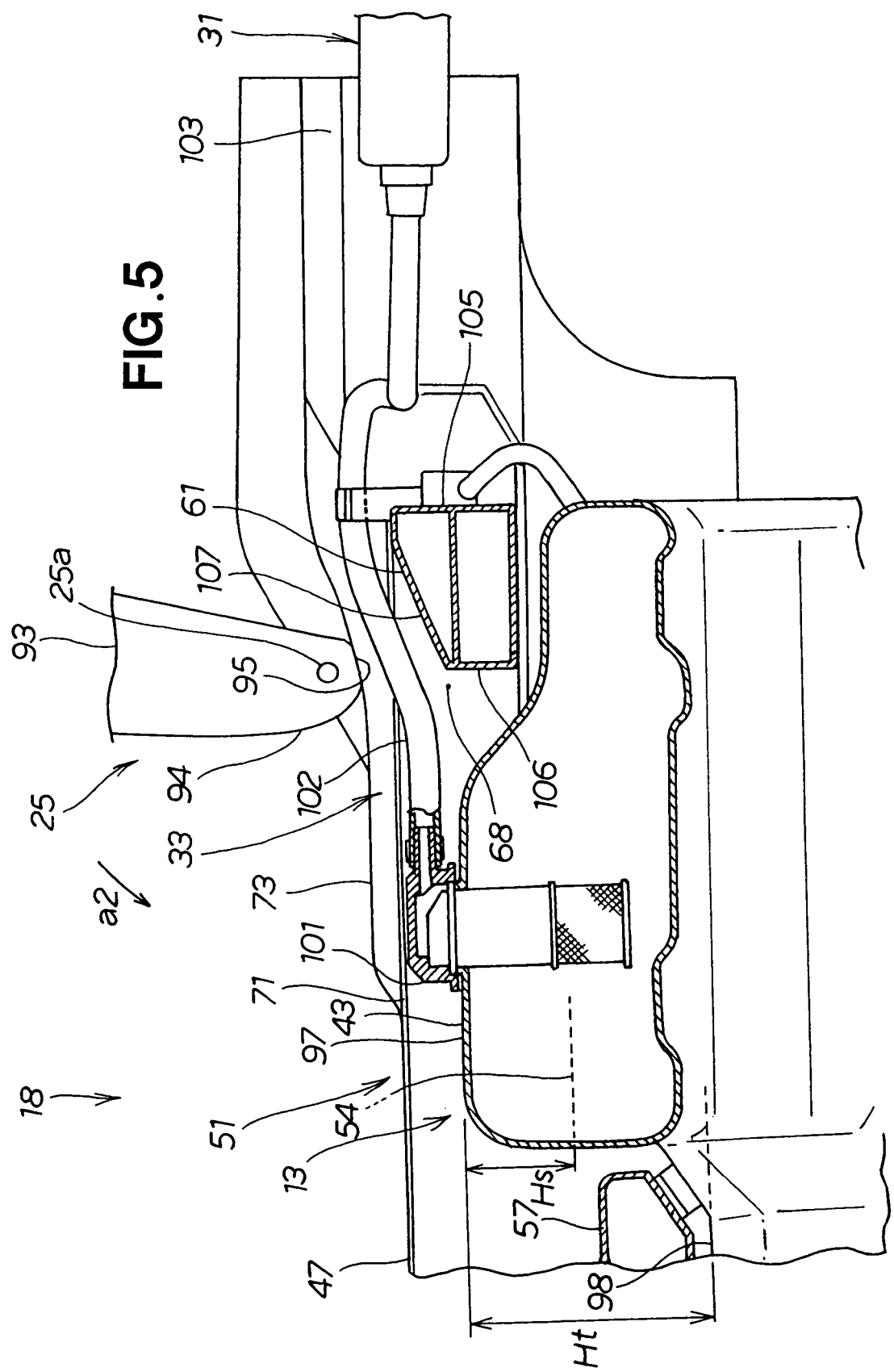
FIG. 5 is a cross-sectional view taken along line 5-5 of FIG. 4.
Figure 6:
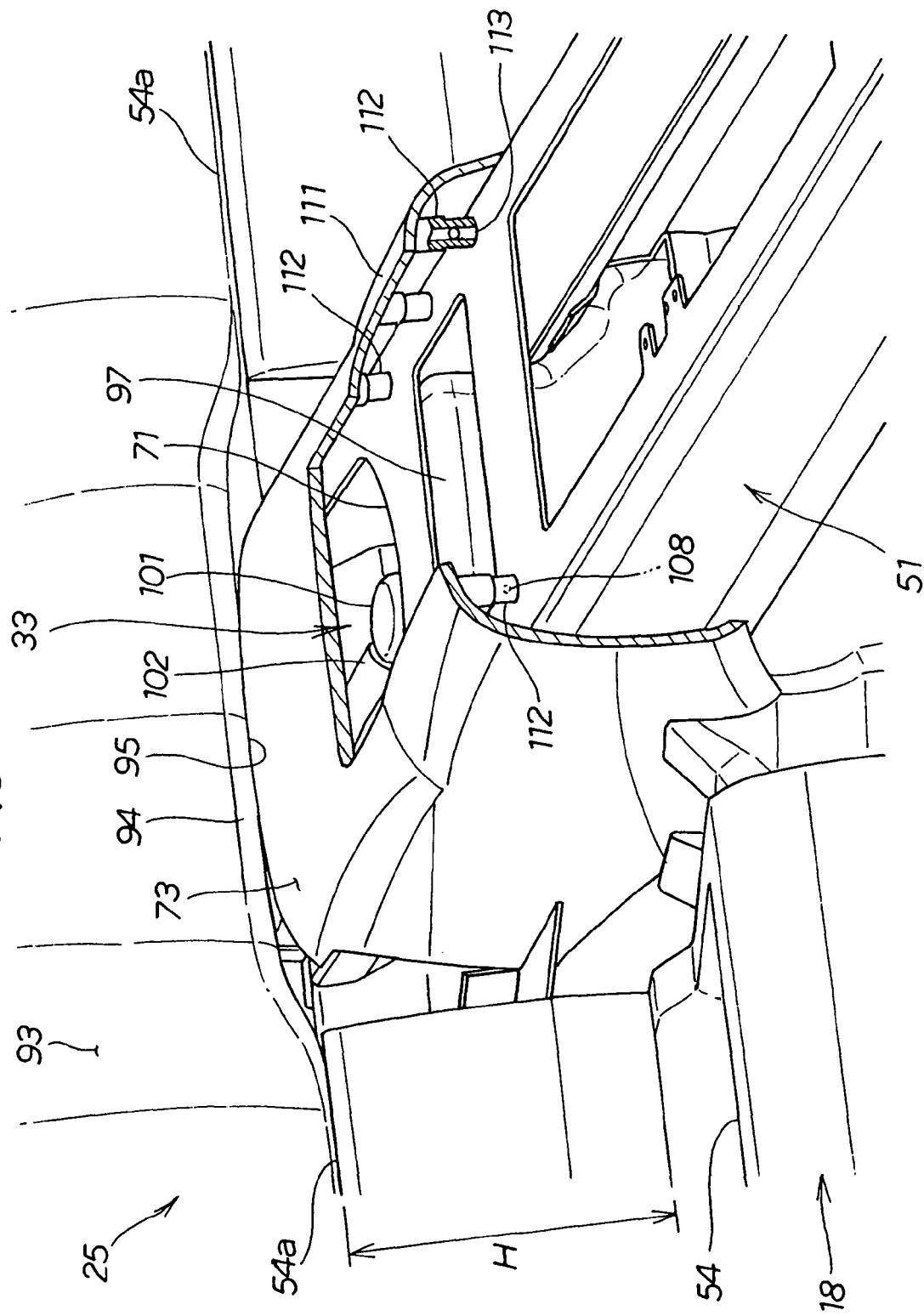
FIG. 6 is a perspective view of the vehicle body as seen in the direction of arrow 6 of FIG. 1.
Figure 7:
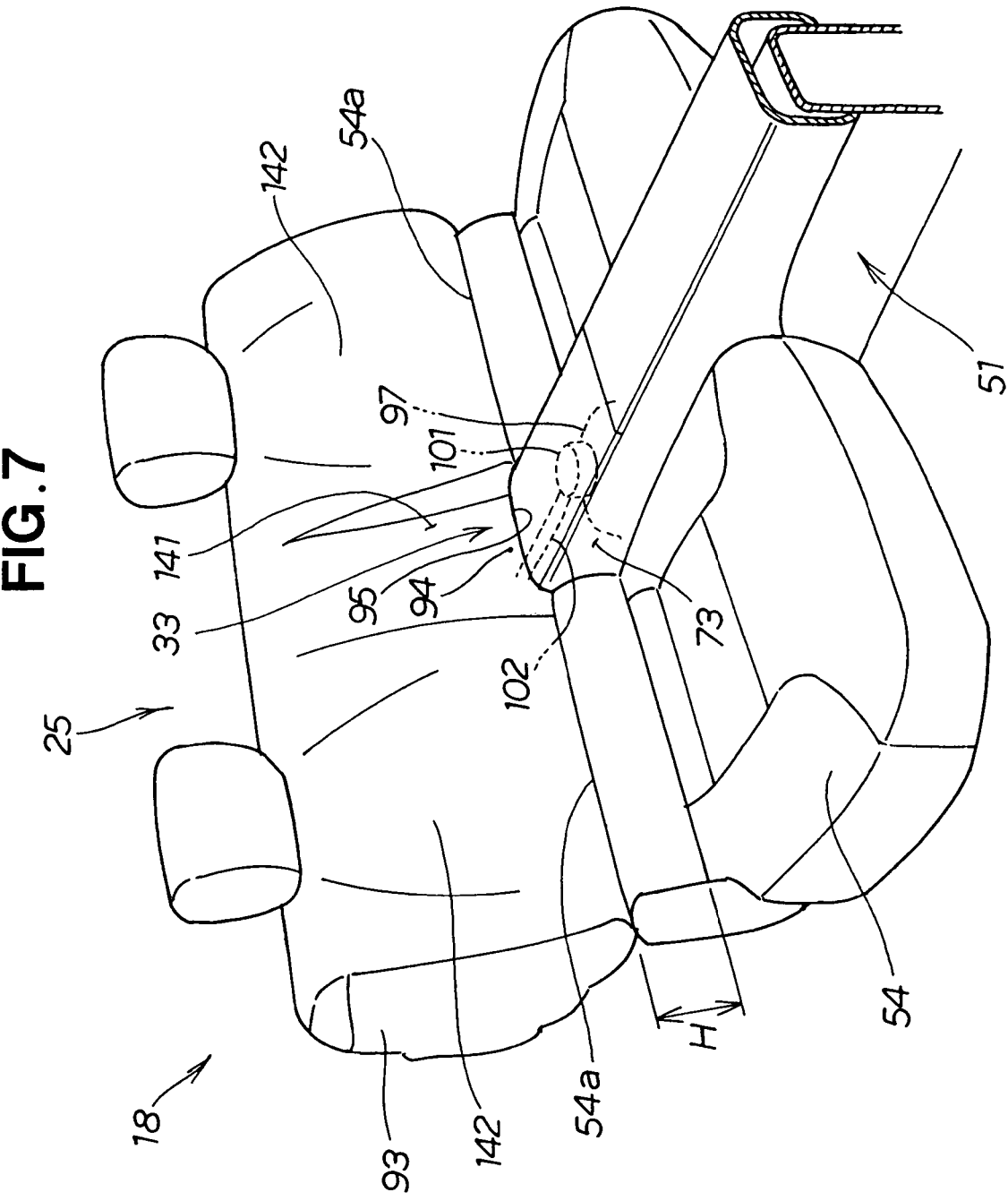
FIG. 7 is a perspective view of a rear seat of the vehicle.

A plurality of latch holes 108 for mounting the groove-shaped interior console member 73 is formed in the expanded portion 51, as shown in FIGS. 5, 6, and 7.

The interior console member 73 has a ceiling portion 111a shaped as an inverted U in cross section and positioned toward the vehicle interior 18, and latch boss portions 112 are formed on the ceiling portion 111 so as to correspond to the latch holes 108 and pins 113. The console member accommodates the piping carrier 95 of the lower surface 94 of the seatback 93.

The seatback 93 has a groove-shaped concave portion 141 cut out so as to correspond to the expanded central portion 51 in the center. The groove-shaped concave portion 141 is an area that is thinner than a back contact portion 142 for supporting the back of a passenger.

The fuel tank 13 in the vehicle body structure 33 of the present invention is thus disposed forward of the rear cross-member (tank rear cross-member) 61 for connecting the lower surfaces of the underbody 15 of the vehicle 12. The evaporated gas guided through the communication path 27 connected to the ceiling plate portion 43 of the fuel tank 13 is processed in the canister 31 disposed to the rear of the rear cross-member 61. The underbody 15 has an expanded portion (expanded central portion) 51 that has the removal opening 71 (FIG. 3) whose rear-end portion in notched. Accordingly, part of the expanded portion 51 is set at a distance from the rear cross-member 61 in the rear-end portion. The communication path 27 connected to the fuel tank 13 is brought out from the removal opening 71 and connected to the canister 31. The capacity of the fuel tank 13 can be increased because a portion of the ceiling plate portion 43 of the fuel tank 13 is positioned inside the expanded portion 51.

The communication path 27 is disposed inside the expanded portion 51. Therefore, the communication path 27, which must be disposed in a high location on the fuel tank, can be accommodated between the underbody 15 and the rear cross-member 61 and can be connected to the canister 31 behind the rear cross-member 61 without interfering with the underbody 15 and the rear cross-member 61 even if a portion of the ceiling plate portion 43 of the fuel tank 13 along the expanded portion 51 is increased in size. Therefore, the communication path 27 can be accommodated next to the canister 31 without compromising the capacity of the fuel tank 13.

The back 93 of the seat (rear seat) 25 is disposed above the rear cross-member 61, as shown in FIGS. 8 and 9. The expanded portion 51 having a desired height (e.g., corresponding to height H) can be formed in the center of the floor panel 47 without interfering with the seatback 93 when the piping carrier 95, which is upwardly concave along the expanded central portion 51 described above, is formed in the lower surface 94 of the seatback 93.

As a result, the communication path 27 can be accommodated between the canister 31 and the fuel tank 13 without compromising the capacity of the fuel tank 13.

Since the rear cross-member 61 is configured so that the height of the front wall portion 106 positioned in the vicinity of the seatback 93 is lower than that of the rear wall portion 105 that faces the front wall portion 106, the distance to the seatback lower surface 94 can be increased, and the depth to which the upper portion is made into a concave shape in order to form the piping carrier 95 can be reduced.

The seatback 93 can be folded forward into a substantially flat configuration without interfering with the expanded portion 51. This is because the groove-shaped concave portion 141 formed in the central portion of the vehicle width direction of the seatback 93 fits into the center expanding portion 51 when the seatback 93 is folded down in the manner indicated by arrow a2 toward the front of the vehicle by using the tilting device 25a.

The groove-shaped concave portion 141 acts as a stopper, and the distance that the seatback 93 can be folded forward can be restricted at the same time that the concave portion 141 of the seatback 93 makes contact with the expanded central portion 51.

The vehicle body structure of the present invention is suitable for disposing piping between the fuel tank and the canister in a state in which the cross-member is interposed between the fuel tank and the canister and in which the upper portion of the fuel tank is disposed in the vicinity of the underbody.

Obviously, various minor changes and modifications of the present invention are possible in light of the above teaching. It is therefore to be understood that within the scope of the appended claims the invention may be practiced otherwise than as specifically described.

What is claimed is:

1. A vehicle body structure having a fuel tank and a canister, comprising:
a floor panel;
a rear cross-member positioned under the floor panel and extending in a direction of width of a vehicle body;
a fuel tank disposed forwardly of the rear cross-member;
a canister disposed rearwardly of the rear cross-member; and
a communication path for connecting a ceiling portion of the fuel tank with the canister,
wherein the floor panel has an expanded portion extending at a center of the width of the vehicle body longitudinally of the vehicle body and expanding upwardly, and a portion of the communication path is accommodated between the rear cross-member and the expanded portion;
wherein the expanded portion has a groove-shaped configuration; and
wherein the communication path is arranged such that said communication path extends above the fuel tank and within the expanded portion, passes through an opening formed through the expanded portion, extends above the rear cross-member and outside the expanded portion, and communicates with the canister.

2. The vehicle body structure of claim 1, wherein the expanded portion is provided with an internal console member.

3. The vehicle body structure of claim 1, wherein the floor panel has a seatback of a seat mounted on the floor panel, the seatback is disposed above the rear cross-member, the seatback has a seatback lower surface, and a notched piping carrier opening downward along the expanded portion is formed in the seatback lower surface.

4. The vehicle body structure of claim 1, wherein the rear cross-member is polygonal in cross-section normal to the longitudinal direction, and a height of a front wall portion of the rear cross-member adjacent to a seatback is less than a height of a rear wall portion of the rear cross-member opposed to the front wall portion.

5. The vehicle body structure of claim 3, wherein the seatback lower surface has a concave portion formed in a shape of a groove so that the expanded portion fits when the seatback is brought forward and folded.

6. The vehicle body structure of claim 1, wherein the fuel tank has an upper portion, and the upper portion of the fuel tank is positioned inside the expanded portion.

7. A vehicle body structure having a fuel tank and a canister, said vehicle body structure comprising:
   an floor panel;
   a rear cross-member positioned under the floor panel and extending in a direction of width of a vehicle body;
   a fuel tank disposed forwardly of the rear cross-member;
   a canister disposed rearwardly of the rear cross-member; and
   a communication path for connecting a ceiling portion of the fuel tank with the canister,
   wherein the floor panel has an expanded portion extending at a center of the width of the vehicle body longitudinally of the vehicle body and expanding upwardly, and the communication path is accommodated between the rear cross-member and the expanded portion; and
   wherein the floor panel has a seatback of a seat mounted on the floor panel, the seatback is disposed above the rear cross-member, the seatback has a seatback lower surface, and a notched piping carrier opening downward along the expanded portion is formed in the seatback lower surface.

8. A vehicle body structure having a fuel tank and a canister, said vehicle body structure comprising:
   an floor panel;
   a rear cross-member positioned under the floor panel and extending in a direction of width of a vehicle body;
   a fuel tank disposed forwardly of the rear cross-member;
   a canister disposed rearwardly of the rear cross-member; and
   a communication path for connecting a ceiling portion of the fuel tank with the canister,
   wherein the floor panel has an expanded portion extending at a center of the width of the vehicle body longitudinally of the vehicle body and expanding upwardly, and the communication path is accommodated between the rear cross-member and the expanded portion; and
   wherein the rear cross-member is polygonal in cross-section normal to the longitudinal direction, and a height of a front wall portion of the rear cross-member adjacent to a seatback is less than a height of a rear wall portion of the rear cross-member opposed to the front wall portion.

* * * * *